United States Patent
Vinnemann

(10) Patent No.: US 7,328,286 B2
(45) Date of Patent: Feb. 5, 2008

(54) AUTOMATIC ADDRESSING ON BUS SYSTEMS

(75) Inventor: Thomas Vinnemann, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/539,606

(22) PCT Filed: Nov. 20, 2003

(86) PCT No.: PCT/EP03/12986

§ 371 (c)(1),
(2), (4) Date: Jul. 14, 2006

(87) PCT Pub. No.: WO2004/059917

PCT Pub. Date: Jul. 15, 2004

(65) Prior Publication Data

US 2006/0282549 A1    Dec. 14, 2006

(30) Foreign Application Priority Data

Dec. 20, 2002 (DE) .............................. 102 61 174

(51) Int. Cl.
G06F 13/10 (2006.01)
G06F 13/38 (2006.01)
H04L 12/403 (2006.01)

(52) U.S. Cl. ...................... 710/9; 710/3; 710/4; 710/8; 710/113

(58) Field of Classification Search ................ None
See application file for complete search history.

(56) References Cited

U.S. PATENT DOCUMENTS

| 5,583,754 | A | | 12/1996 | Broghammer et al. |
| 5,793,993 | A | * | 8/1998 | Broedner et al. ............ 710/106 |
| 5,872,934 | A | * | 2/1999 | Whitehouse et al. ....... 710/300 |
| 5,944,803 | A | * | 8/1999 | Whitehouse ................. 710/63 |

FOREIGN PATENT DOCUMENTS

| DE | 37 36 081 A1 | 5/1989 |
| DE | 44 04 962 A1 | 8/1996 |
| DE | 196 21 272 A1 | 11/1997 |
| DE | 196 47 668 A1 | 5/1998 |
| DE | 100 38 783 A | 3/2001 |
| DE | 101 47 512 A1 | 4/2003 |
| EP | 0 854 609 A2 * | 7/1998 |
| EP | 1 298 851 A | 4/2003 |
| FR | 2 214 385 A | 8/1974 |
| WO | WO 97/45983 A1 | 12/1997 |

* cited by examiner

Primary Examiner—Ilwoo Park
(74) Attorney, Agent, or Firm—Crowell & Moring LLP

(57) ABSTRACT

In a method and apparatus for automatic address allocation among control devices connected to a bus system in a vehicle, and address allocation period sending a message on the common data bus line. During the address allocation period, the common data bus line is broken into individual subsections by respective isolating means in each of the control appliances. In addition, the control devices which are to be addressed place their respective transmission unit at a transmission potential.

15 Claims, 2 Drawing Sheets

AUTOMATIC ADDRESSING ON BUS SYSTEMS

BACKGROUND AND SUMMARY OF THE INVENTION

This application claims the priority of German patent document 102 61 174.2, filed Dec. 20, 2002 (PCT International Application No. PCT/EP2003/012986, filed Nov. 20, 2003), the disclosure of which is expressly incorporated by reference herein.

The present invention is directed to a method and apparatus for automatic address allocation by control devices connected to a bus system in a vehicle, where the control devices interchange data using transmission/reception units via a common data bus line, and the control devices simultaneously access the data sent using the common data bus line.

In order to allow communication between control devices in data bus systems, the control devices must have an individual address, which allows the control devices (or "subscribers") in the data bus system to interchange messages and data with one another. In particular, it is possible to send messages directly to any subscribers in the data bus system, and it is normally also possible to ascertain the sender of a message.

In address setting or allocation, it is necessary to ensure that the correct addresses are allocated to the appropriate subscribers. In particular, in order to avoid interference, the same addresses must not be allocated multiple times to different subscribers. It should be a simple matter to handle the incorporation of a further subscriber into the data bus system and the associated address expansion.

A "Daisy Chain" are frequently used in data bus systems on vehicle in order to figure the control devices connected to the data bus system, particularly in order to make address settings.

A "daisy chain" connection is an individual point-to-point data line connection which is a series or ring connections between a central control unit ("the "master") and the other subscribers "(the "slaves"), in the "daisy chain" connection. In a "daisy chain" connection, a signal emitted by the central processing unit on the data line reaches only the first subscriber, is forwarded therefrom to the next subscriber, which in turn forwards the signal to the next subscriber etc. All subscribers can receive identical signals when the signals are not altered upon forwarding. In addition, in contrast to other bus systems, any subscriber in the chain can change one or more signals before it forwards the signal. The time-delayed forwarding allows a plurality of messages to be forwarded on the "daisy chain" connection, for example the second subscriber can forward an electrical signal to the third subscriber while the master is already sending the next signal to the first subscriber.

In a "daisy chain" connection, the signal return path generally runs directly from the last slave in the chain to the master. Unidirectional communication is permitted on the signal return path. Alternatively, the signal return path may be terminated at the last subscriber by means of a resistor, in which case the data lines should then be in bidirectional form.

Subscribers in a "daisy chain" connection have at least two interfaces for data interchange or for communication via the bus system. One of the two interfaces (in particular, the first interface) is in the form of a communication interface for receiving data from a subscriber which is connected upstream in the "daisy chain" connection, while the second interface is a communication interface for connection to a downstream subscriber in the bus system. If the "daisy chain" connection is bidirectional, the communication interfaces likewise need to be of bidirectional orientation.

A bus system which is designed using a "daisy chain" connection can only provide communication from master to slave or vice versa. There is no provision for actual communication between the slaves (that is, the subscribers in the bus system).

The fact that in a "daisy chain" connection the signals are forwarded from subscriber to subscriber in sections means that the "daisy chain" connection is often called a "non-jointly used connection". In contrast, "jointly used connections" are those which can be accessed by the subscribers with equal authority and where all subscribers can receive data simultaneously on account of the electrical or optical connection to the data line, as is implemented in the Control Area Network (CAN) protocol, for example.

Often, the address configuration for the subscribers in an arbitrary bus system is obtained using a (sub)bus system, which is constructed from a "daisy chain" connection (that is, a non-jointly used connection). Data communication between the subscribers in the data bus system takes place using an additional, jointly used connection which allows individual communication with equal authorization on account of the actual data protocol between the subscribers.

German patent document DE 100 38 783 discloses a method and an apparatus for automatic address allocation to a plurality of subscribers in a bus system using "daisy chain" connection. Upon receipt by the first interface of an unmistakable, explicit command from the master in a data packet for address allocation, each slave subscriber stores the part which is to be interpreted as an address in an address memory which can be accessed by the respective subscriber, and forwards the data packet with the same command and an altered address value to a neighboring subscriber via the second interface.

German patent document DE 37 36 081 A1 discloses a method and an apparatus for address setting by subscribers which are connected to a central processing unit via a bus. In addition, the subscribers on the bus are connected in series by means of a "daisy chain" connection coming from the central processing unit. The subscribers' address setting is obtained using the "daisy chain" connection. A signal with a particular binary value on the "daisy chain" connection at the input of the first subscriber causes the latter to pick up an available address on the bus from a data packet produced in the central processing unit and to output the particular binary value to the "daisy chain" connection. The subscriber sends the address picked up to the central processing unit as a response. The method then continues at the neighboring subscriber.

U.S. Pat. No. 5,583,754 and French patent document FR-A-2 214 385 each describe a data bus system of the generic type, with a central control device and periphery components.

German patent document DE196 21 272 A1 discloses an addressing apparatus for a slave station in a serial bus system and a method for addressing a slave station. The slave stations contain a switching apparatus which is coupled into the data line to the downstream slave station in order to interrupt the data line on the basis of a switching signal from the control device.

One object of the present invention is to provide a method and a bus system which optimizes automatic address allocation in a bus system with a common data line.

This and other objects and advantages are achieved by the method and apparatus according to the invention, in which an address allocation period is started by means of a message on the jointly used data bus line. During the address allocation period, the message is taken as a basis for electrically breaking the common data bus line into individual subsections by virtue of the control device which are to be addressed using a respective isolating means. In addition, the control devices which are to be addressed place their respective transmission unit at a transmission potential.

The data line 2 is routed such that a connection is provided between the subscribing control devices 3-6. The data line is thus connected through between the input and output of the control device.

This and other objects and advantages are achieved by the method and apparatus according to the invention, in which an address allocation period is started by means of a message on the jointly used data bus line. During the address allocation period, the message is taken as a basis for electrically breaking the common data bus line into individual subsections by virtue of the control device which are to be addressed using a respective isolating means. In addition, the control devices which are to be addressed place their respective transmission unit at a transmission potential.

Depending on the bus system chosen, the data bus line may be in the form of single-wire, two-wire or multiwire data lines.

References herein to the "simultaneous" reception of data sent on the data bus by means of the control devices does not mean absolutely simultaneous reception, but rather reception in a time interval which covers the propagation of the electromagnetic wave on the data bus line.

One advantage of this arrangement is that a common data bus line is split into individual subsections during the period of address allocation, so that a "daisy chain" connection (particularly a "non-jointly used" connection), topology is obtained between the control devices which are to be addressed as bus subscribers.

Since the common data bus line is used for addressing, no additional data bus line is required between the control devices. In addition, the control devices need not need be equipped with a further bus protocol, such as would be necessary in order to be able to communicate via such an additional data bus line for addressing. Standard control devices, in which the address setting is intended to be performed using the inventive method, therefore need be altered only to a minimal extent.

The method has the particular advantage that it can also be used for bus systems containing subscribers with equal authorization (that is, not a master/slave system as described above). The address allocation merely needs to be initiated by a control device using a signal.

The method according to the invention also has the advantage that, in contrast to known addressing methods, the master can be located at any position in the bus system, rather than at the start or end of the data bus line, as is required with a "daisy chain" connection. The reason for this is that the start signal for address allocation is obtained at a time at which the common connection is available to all control devices.

Since the master can be positioned in the bus system as desired, it is a simple matter to extend the address allocation to other control devices in the existing bus system. For example, when control devices are arranged in series and there is a master at an arbitrary position, the control devices can be incorporated into the address allocation to the right and/or left of the master.

A further advantage is that the method according to the invention can be used in bus systems in which less than all control devices in the bus system are involved in the addressing method. (That is, for example, control devices configured in standard fashion already exist on the bus system). This is ensured, in particular, by virtue of just control devices which are to be addressed being involved in the method.

The method can also be applied when a further control device (which is to be addressed) is added to or removed from the bus system, since all control devices to be addressed are involved in the address allocation.

The method is not limited to bus systems connected in series. Rather, it may also be used on bus systems with a ring structure, in particular.

It is advantageous for the transmission unit in the control device which is to be addressed to turn on and send a signal, because this ensures that there is an electrical parameter for determining whether there is a further control device which is to be addressed on the data bus line.

The address to be allocated is independent of the position of the subscriber in the bus system, since the check to determine whether there is a further downstream control device to be addressed takes place after a time $T_{SG}$ which is individually stipulated for each control device which is to be addressed. This means that the address to be allocated is likewise transmitted to the control device independently of the position of the control device. There is thus no address allocation required, such as rising address, in line with the order of the position of the control devices in the bus system.

One advantage of the invention is that the method can be applied not only in bus systems containing single-wire data lines but also in bus systems with two-wire data lines, since the electrical parameter determined is a differential voltage level at the output to the downstream control device, as is obtained for determining signal transmission in line with the respective bus system on the data bus line.

The method can thus be used in a bus system based on the LIN (Local Interconnect Network) standard. In line with the LIN protocol, the data bus line provided is a single-wire data line for signal or data transmission. The signal transmission or evaluation takes place in the LIN bus by determining the differential voltage level between the LIN or the single-wire data line and the ground potential.

The method may likewise be used in a bus system with a two-wire data line, such as a CAN (Controller Area Network) data bus. For signal evaluation on a CAN bus, the voltage difference between the two data lines is measured, which is evaluated in the method as an electrical parameter.

One advantage of the invention is that in the case of a single-wire data line the electrical parameter measured is the current on the data line at the output to the downstream control device, since current measurement is easy to implement in the control device.

It has advantageously been recognized that if there is a downstream control device which is to be addressed then the data line is closed again, using the isolating means in the particular control device which is to be addressed, and the transmission unit in that particular control device turned off. A control device which is to be addressed thus forwards the address setting option to a further control device which is to be addressed. In this manner, it is possible to ascertain an individual control device for address setting. This step thus optimizes the method.

It is advantageous for the isolating means to be in the form of a switchable connection, such as a switching transistor or a relay or a repeater, which are available at low cost on the market today.

A further advantage of the method is that it may also be used in optical bus systems by using repeaters as the isolating means.

The fact that control devices which are not involved in the addressing do not send any data to the data bus line in the address allocation period prevents the address allocation from being disrupted. In particular, this method allows the address allocation to be limited to the control devices which are to be addressed which are involved.

It has advantageously been recognized that during the address allocation period no control device is able to send a signal for connecting the control devices (that is, for closing the interrupted data line) to all control devices, since the data bus line is partially interrupted, of course. For this reason, the period of address allocation is limited to a time $T_{MAX}$. The control devices involved in the address allocation restore the common data bus line by reconnecting the interrupted data bus line after the time $T_{MAX}$, which is known to every control devices involved.

Advantageously, the start signal already contains the address which is to be allocated, which means that no further signal from a control device is needed for the other control device which are to be addressed.

It has advantageously been recognized that address allocation period is produced as part of an addressing cycle and is started repeatedly by means of automatic flow control until an address setting has been made on all control devices which are to be addressed.

The automatic flow control has the advantage that this needs to be performed only once using a control device. After that, the control devices automatically start the period of address allocation again after a particular time $T_{CYC}$. In this context, $T_{CYC}$ needs to be chosen to be greater than $T_{MAX}$, since an address allocation period must to be concluded first, before a further period for renewed address allocation is started.

The automatic flow control may also be performed by virtue of a control device repeatedly starting the address allocation period automatically, and accordingly transmitting an address which is to be allocated upon every start signal.

In one embodiment of the invention, the measuring arrangement has means for controlling the isolating means and the transmission/reception unit in the control device in question, the means for control taking the evaluation of the measured signals as a basis for controlling the isolating means and the transmission/reception unit.

One advantage of this arrangement is that, by looping the data bus line through the control device in conjunction with the isolating means contained in the control device, the control device is able to interrupt a common data bus line and also to reconnect it.

A further advantage is that the changes which are to be made can be implemented with minimal cost involvement on standard control devices which are already in use on the market.

Another advantage which has been recognized is that the development of the measuring arrangement has a comparison means which through simple comparison of input signals produces an output signal which is in turn used to control the transmission/reception unit and the isolating means.

Preferably, the comparison means is in the form of a comparator circuit on account of its switching speed.

Other objects, advantages and novel features of the present invention will become apparent from the following detailed description of the invention when considered in conjunction with the accompanying drawings.

DETAILED DESCRIPTION OF THE DRAWINGS

Figure 1:
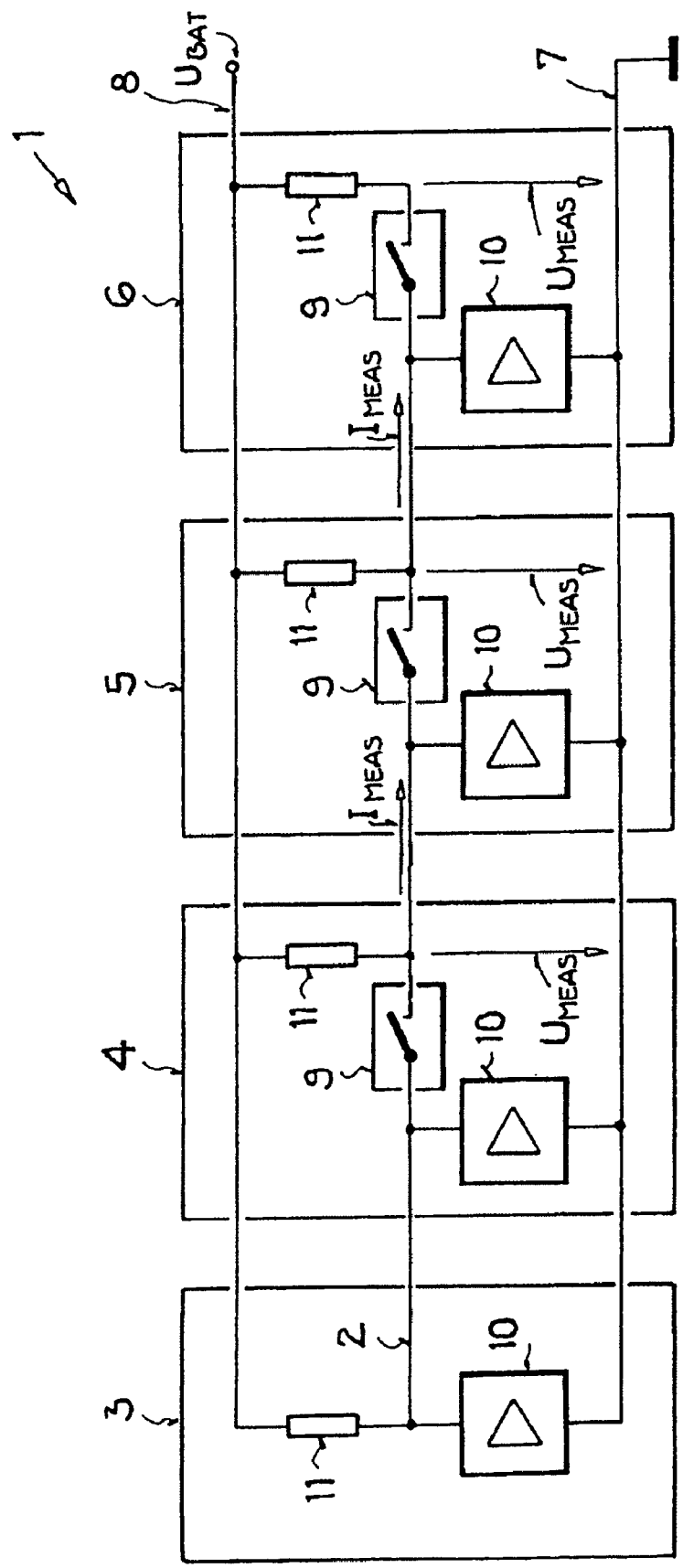
FIG. 1 shows an inventive bus system for carrying out the inventive method.

The invention relates to a method for automatic address allocation by control devices 3-6 connected to a bus system 1 in a vehicle, such as shown in FIG. 1. The control devices 3-6 interchange data using transmission/reception units 10 via a common data bus line 2, simultaneously accessing the data sent via the data bus. To this end, an address allocation period is initiated by transmission of a message on the common data bus line 2. The message is taken as a basis, for electrically breaking the common data bus line 2 into individual subsections during the address allocation period. For this purpose, the control devices 4-6 which are to be addressed use respective isolating means 9 to electrically break the common data bus line 2. In addition, the control devices 4-6 which are to be addressed place their respective transmission unit 10 at a transmission potential.

The bus system 1 in FIG. 1 is in the LIN standard (Local Interconnect Network—http://www.lin-subbus.org) with a data bus line and control devices 3-6, the latter being engine control devices for air conditioning applications in a motor vehicle. Communication between the control devices 3-6 takes place in accordance with the LIN protocol, with equal authorization on the common data bus line.

In accordance with the LIN standard, the data bus line contains not only the actual single-wire data or LIN line 2, but also a voltage supply line 8 and a line 7 which is connected to the ground potential. The differential voltage level $U_{MEAS}$ measured on the data line 2 with respect to the ground line 7 is used to transmit and evaluate electrical signals according to the LIN protocol. The data or messages sent on the data line 2 can be received by the control devices 3-6 simultaneously.

The data line 2 is bidirectional, and since the LIN standard is involved, it is not terminated at the last subscriber in the bus system 1, control device 6.

The data line 2 is routed such that a connection is provided between the subscribing control devices 3-6. The data line is thus connected through between the input and output of the control device.

As transmission/reception unit 10, the control devices 3-6 in FIG. 1 have an LIN transceiver or LIN bus driver, which ensures that the data are moved to the data line 2 in accordance with protocol. The transmission/reception unit (or the LIN transceiver) 10 is connected to the data line 2 within the control device 3-6. In addition, the control devices 3-6 have a voltage supply and a microcontroller (not shown) for performing their function-related tasks.

During the address allocation period, the control device 3 undertakes the function of the master control device and the control devices 4-6 undertake the function of the slave control devices.

The master control device 3 has a programmed control algorithm which initiates, regulates and monitors address allocation to the slave control devices 4-6, ensuring the correct address allocation. The master control device 3 thus knows the sequence or order and number of the slave control device 4-6 which are connected to the bus system 1 and which are to be addressed.

Each of the slave control devices 4-6 have an isolating means 9 in the form of a switching transistor or switch that can be used to interrupt the data line 2. The switch 9 is positioned between the resistor 11 for the voltage supply line 8 (the "pullup resistor") and the LIN transceiver 10.

Each of the control devices 4-6 has a measuring arrangement (which has a comparator circuit as comparisong means) for determining the differential voltage level $U_{MEAS}$. In addition, the measuring arrangement uses the control unit 17 (FIG. 2) to control the switch 9 and the transmission/reception unit 10 based on the measurement result.

Each of the slave control devices 4-6 has a programmed control algorithm which implements the method steps that it is to extecute, particularly address setting, measurement of the differential voltage level $U_{MEAS}$, control of the switch 9 and of the LIN transceiver 10.

The voltage supply line 8 is connected to the data line 2 via a resistor 11, so that the LIN or data line 2 has a defined quiescent voltage, the "recessive level", of $U_{BAT}$=12 V in the quiescent state. When the LIN transceiver 10 is turned on (that is, a signal is sent), the data line 2 is connected through to the ground line 7, so that the differential voltage level $U_{MEAS}$ falls to zero or ground potential, which corresponds to the "dominant level".

It should be noted that an LIN transceiver 10 behaves like a switch: upon turning it on (that is, when a dominant level is sent), the data line 2 is connected to the ground line in order to obtain the zero signal "dominant level". Upon interruption (that is, when a recessive level is sent or in the quiescent state), the data line 2 is isolated from the ground line 7.

In the normal operational mode, when the control devices 3-6 communicate with equal authority via the jointly used data line 2, the LIN transceivers 10 of the master and slave control devices 3-6 which are involved are ready for transmission and reception. The switches 9 for breaking the data line 2 are closed and are thus connected through.

The address allocation period is started by a message from the master control device 3 on the common data line 2 to all connected control devices 4-6. The message already contains the address which is to be allocated. Each of the slave control devices 4-6 to be addressed immediately used its switch 9 to interrupt the data line 2. (Accordingly, from this time onward, it is not possible to send data with equal authority to all control devices 3-6 in the bus system, since the jointly used data line has been interrupted.) At the same time, the LIN transceiver 10 in the slave control devices 4-6 which are to be addressed is turned on, so that a connection is made between the ground line 7 and the data line 2.

The control devices 4-6 now monitor the differential voltage level $U_{MEAS}$ at their respective output, with the differential voltage level $U_{MEAS}$ between the ground line 7 and the data line 2 to the downstream control device 4-6. The differential voltage level $U_{MEAS}$ is measured by the respective slave control device 4-6 after a time $T_{SG4}$, $T_{SG5}$, $T_{SG6}$ which is individually stipulated for each slave control device 4-6 that is to be addressed and which has been disclosed to the respective control device 4-6. Each slave control device 4-6 takes the measurement result as a basis for deciding whether a further control device to be addressed is connected downstream and decides, on the basis of the result, whether it remains a control device to be addressed in this address allocation period or excludes itself from the address allocation in this address allocation period by connecting the data line 2.

Since the differential voltage level $U_{MEAS}$ is measured in every slave control device 4-6 after its time, which is individually stipulated for each control device (that is, for the control device 4 after the time $T_{SG4}$, for the control device 5 after the time $T_{SG5}$ etc.), the recognition of whether there is a downstream control device may also have been concluded for a control device 4-6 at any position on the bus system 1 to start with.

It should be pointed out that the individual times $T_{SG4}$, $T_{SG5}$, $T_{SG6}$ do not exceed a maximum value $T_{MAX}$. This maximum time period $T_{MAX}$ is known to all control devices 3-6 in the bus system 1, and is geared to the point from which the bus system 1 becomes available for the joint data traffic again. At this time $T_{MAX}$, the data line isolating switch 9 in each of the control devices 4-6 is closed.

If a control device 4-6 to be addressed (for example, slave control device 5) has a further, downstream slave control device 4-6 which is to be addressed in this address allocation period, (for example, control device 6), available for it, then the voltage measurement produces the ground potential (that is, a level which is dominant in line with the LIN protocol). The dominant level is obtained because the downstream slave control device 6 which is to be addressed has turned on its LIN transceiver 10, and the data line 2 is interrupted such that there is now only a connection between the "pullup resistor" 11 in the upstream control device 5 and the turned-on LIN transceiver 11 in the downstream slave control device 6.

On the other hand, if a control device 4-6 to be addressed (for example, control device 5Y does not have a downstream slave control device 4-6 (such as control device 6), available, or if a slave control device 4-6 which is not or no longer to be addressed in this period of address allocation period, then the result of the measurement $U_{MEAS}$ is the supply voltage which is present on the data line 2 across the resistor 11 (that is, a level which is recessive in line with the LIN protocol). The recessive level is obtained because the downstream slave control devices which are not involved in the addressing have connected the data line 2 running in the respective control devices, and the respective LIN transceiver 10 is no longer turned on.

The measurement of the differential voltage level $U_{MEAS}$ thus corresponds to a voltage measurement using a voltage divider. The voltage divider is formed by two resistors connected in series between the ground line 7 and the voltage supply line 8, where the "first resistor" corresponds to the pullup resistor 11 of a control device and the "second resistor" corresponds to the LIN transceiver 10 of the downstream control device. The measured voltage level at the voltage measurement point between the resistor 11 and the LIN transceiver 10 is determined by the switching of the LIN transceiver 10 (that is, open or closed).

If the measurement result shows that the exemplary control device 5 has a downstream control device 6 which is to be addressed, then the LIN transceiver 10 in the control device 5 is turned off and the data line 2 is connected by means of the switch 9. Hence, in this address allocation period, no address setting is performed on the control device 5. It is necessary to wait for another address allocation period.

On the basis of their respective time $T_{SG4}$, $T_{SG5}$, $T_{SG6}$, the control devices 4-6 to be addressed thus connect the data line 2 and turn off the LIN transceiver 10 until finally only the control device 4 to be addressed which is connected last in the addressing cycle, as seen from the master control device 3, now has its LIN transceiver 10 turned on and the data line 2 interrupted.

In the case of this control device (for example control device 5), the data line 2 remains interrupted and the LIN transceiver 10 remains turned on until the time $T_{MAX}$ has elapsed. Then, the address transmitted with the start message for the address allocation period is adopted. The addressing has been concluded for the control device 5. The control device 5 no longer involves itself in further addressing cycles under the prompting of the master control device 3. In the address allocation period, the control device 5 will no longer turn on its LIN transceiver 10, and does not send during the address allocation period. The data line 2 also remains connected in the control device 5 for the address allocation period.

In further cycles, the remaining, as yet unaddressed control devices, for example control device 4, can now be addressed. That is, in a subsequent cycle, the slave control device 4 now recognizes after the time $T_{MAX}$ that there is no downstream slave control device 5, 6 to be addressed, since the differential voltage measurement at the output of the slave control device 4 does not produce a dominant level. The slave control device 4 now adopts the address transmitted by the master control device 3.

With this method, the address allocation is started beginning with the slave control device 6 to be addressed which is connected last as seen from the master control device 3. The last address allocation corresponds to the addressing of the slave control device 4 to be addressed which is connected first as seen from the master control device 3.

The order of the slave control devices 4-6 in the connection arrangement on the bus system is crucial for the addressing. In each addressing cycle, it is always the control device which is connected last (as seen from the master control device) which is addressed, since this control device cannot establish a downstream control device which is to be addressed.

Figure 2:
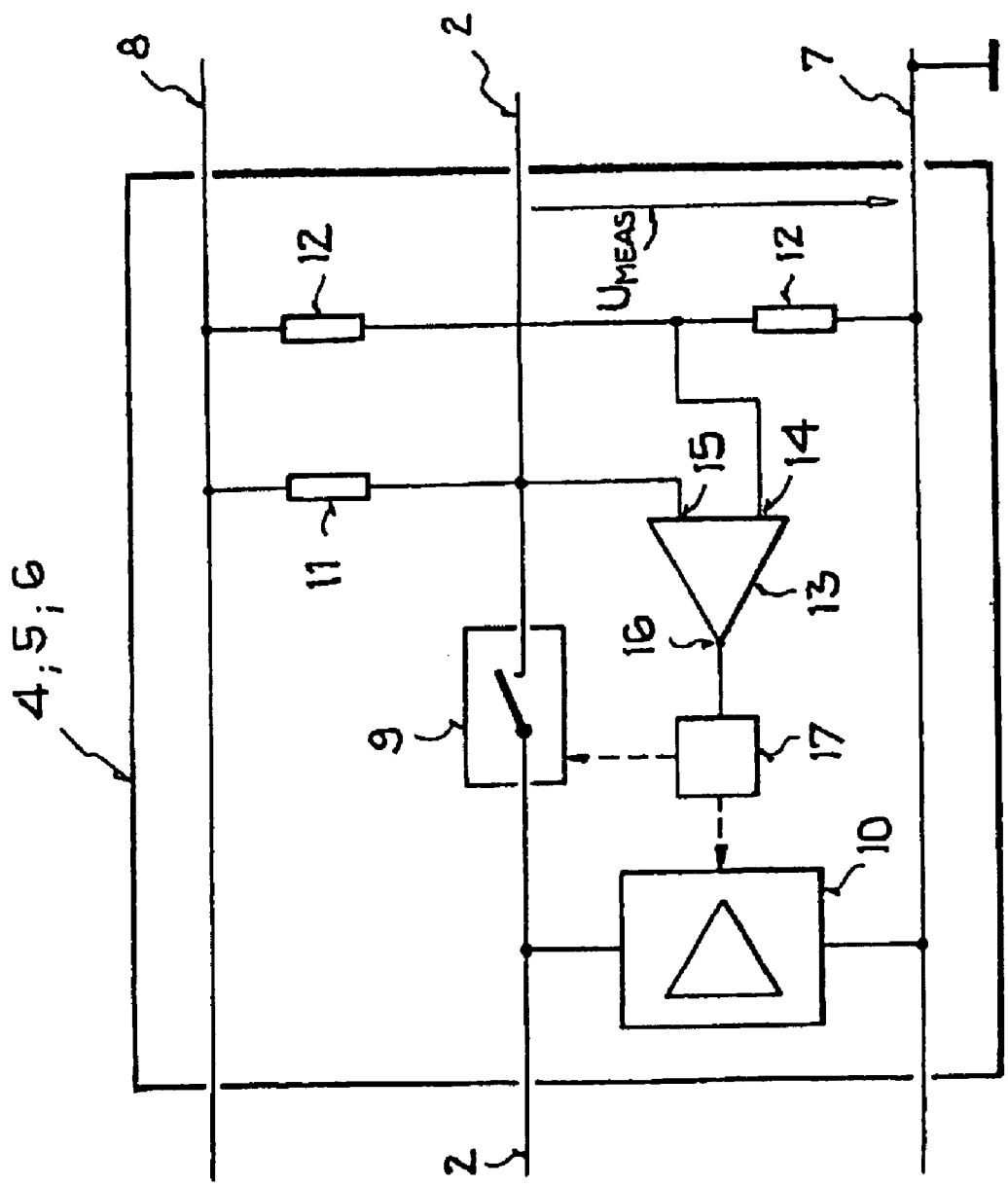
FIG. 2 shows a control device with an inventive measuring arrangement.

FIG. 2 shows a measuring arrangement by way of example, as is implemented in the control devices 4-6. The measuring arrangement has a comparator 13 with two inputs 14, 15 and an output 16. The output signal 16 from the comparator 13 is connected via a line to a control unit 17 which takes the comparator output signal as a basis for controlling the switch 9 and the transmission/reception unit 10 in the respective control device 4; 5; 6. To this end, an input of the comparator 15 is placed at the potential of the data line 2 at the output of the control device 4; 5; 6, which has a recessive or dominant voltage level. An input of the comparator 14 is placed constantly at the quiescent voltage of $U_{BATT}$=12 V (that is, at a recessive level which is tapped off between the ground line 7 and the voltage supply line 8 via resistors 12 in a voltage divider). From the comparison of the two input signals, the comparator ascertains an output signal which indicates whether the input signal 15 has a recessive or dominant voltage level. In line with this output signal, the control unit switches the switch 9 and the transmission/reception unit 10.

The master control device 3 knows the order or the arrangement of the slave control device 4-6 in relation to the master control device 3. This means that the master control device 3 is able to perform address allocation in line with the stipulations on the slave control devices 4-6.

The method is not limited to bus systems based on the LIN protocol. Rather, it may likewise be used on bus systems such as CAN (Controller Area Network), FlexRay, TTP (Time Triggered Protocol), D2B (Domestic Digital Bus), MOST (Media Oriented Systems Transport), since the latter's data communication is based on single-wire or two-wire data lines. In the case of bus systems with two-wire data lines, such as CAN, the switch 9 must be present for both data lines.

The transmission/reception unit 10, in this case in the form of a LIN transceiver, is geared to the chosen bus protocol and bus system.

The switch 9 for switchably interrupting the data line 2 is in the form of a switching transistor. Alternatively, the switch may also be in the form of a relay. For bus systems whose data line 2 is optical, it is advantageous for the switch to be in the form of a repeater which does not forward the data during addressing, that is to say during interruption.

The exemplary embodiment is in the form of a "daisy chain" connection with series-connected control devices 3-6, the master control device 3 being positioned at one end of the series circuit, and the slave control device 4-6 being connected downstream of the master control device 3 in just one direction.

Alternatively, the method may be used in bus systems in which, for a series circuit, the slave control devices 4-6 are situated to the left and right of the master control device 3. In this case, the master control device 3 simply behaves in the address allocation period like a control device which is not to be addressed. The master control device does not interrupt the data line and also does not turn on its transmission unit in the address allocation period. This means that bus systems with control devices arranged in a series circuit require no isolating means (that is, no additional modification) for the master control device.

In bus systems which are designed in a ring topology, the master control device (that is, the control device which initiates the addressing) has to interrupt the data bus line (and hence the ring) without switching in its transmission unit. The master control device would thus need to have an isolating means for interrupting the data line, in the same manner as the slave control devices.

The measuring arrangement for measuring the electrical parameters may also be in the form of a current measuring device in a single-wire data line system like the LIN bus system. In this context, the measuring arrangement measures the current which flows from the output of the upstream slave control device to the input of the downstream slave control device.

The comparison means is in the form of a comparator circuit in the exemplary embodiment. Alternatively, the comparison may also be made by means of software (that is, using a program). In this case, the comparison means is the processor with the software program running on it, which performs the comparison.

In addition, the control unit 17 and the comparison means 13 may be combined as one hardware chip, for example ASIC. This is suitable particularly when the comparison is performed by means of software.

In the exemplary embodiment, the address to be allocated is given at the same time as the start signal whenever the address allocation period starts. The address to be allocated can also be calculated by an algorithm implemented in the slave control device, with the address to be allocated being formed automatically on an up-to-date basis using the algorithm. An example of such an algorithm is address counter imcrementation. Address allocation using an algorithm implemented in the slave control is appropriate particularly in connection with automatic flow control of the addressing cycles. In this context, the master initiates the addressing only once. After that, the unaddressed slaves repeat this cycle after a common waiting time $T_{CYC}$, which must be greater than $T_{MAX}$, the address allocation until the last slave control device has been addressed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for automatically allocating addresses among control devices connected to a data bus system, in which the control devices interchange data, using respective transmission/reception units, via a common data bus line, and simultaneously access data sent using the common data bus line; said method comprising:
   starting an address allocation period by transmitting a message on the common data bus line to a plurality of control devices that are to be addressed, said message containing an address that is to be allocated;
   in response to the message, during the address allocation period, electrically breaking the common data bus line into individual subsections, by each of the control devices which are to be addressed using a respective isolating means for electrically breaking the common data bus line;
   each of the control devices which are to be addressed placing its respective transmission/reception unit at a transmission potential;
   each of said control devices determining whether there is a downstream control device which is to be addressed; and
   only a control device which determines that there is no downstream control device that is to be addressed accepting said address contained in said message.

2. A method for automatically allocating addresses among control devices connected to a data bus system, in which the control devices interchange data, using respective transmission/reception units, via a common data bus line, and simultaneously access data sent using the common data bus line; said method comprising:
   starting an address allocation period by transmitting a message on the common data bus line to a plurality of control devices that are to be addressed;
   in response to the message, during the address allocation period, electrically breaking the common data bus line into individual subsections, by each of the control devices which are to be addressed using a respective isolating means for electrically breaking the common data bus line; and
   each of the control devices which are to be addressed placing its respective transmission/reception unit at a transmission potential;
   wherein, during a period of address allocation,
      each control device has an individually assigned time $T_{SG}$;
      at least one control device which is to be addressed measures an electrical parameter after the time $T_{SG}$ which has been assigned for that at least one determined control device, in order to determine whether there is a downstream control device which is to be addressed; and
      said at least one control device allocates itself an address if there is no downstream control device which is to be addressed.

3. The method as claimed in claim 2, wherein said electrical parameter determined is a differential voltage level at an output of the at least one control device to a downstream control device, as is obtained for determining message transmission in line with the bus system on the data bus line.

4. The method as claimed in claim 3, wherein the electrical parameter measured is current on the data line at an output of the at least one control device to a downstream control device, when the data bus line is in the form of a single-wire data line.

5. The method as claimed in claim 2, wherein, in each particular control device, if there is a downstream control device that is to be addressed then the data bus line is closed by that particular control device, using the isolating means, and the transmission/reception unit in that particular control device is turned off.

6. The method as claimed in claim 5, wherein the isolating means comprises a switching transistor, a relay and a repeater.

7. The method as claimed in claim 6, wherein control devices which are not involved in the address allocation do not send any signals to the data bus line in the address allocation period.

8. The method as claimed in claim 7, wherein:
   after a time $T_{MAX}$, the isolating means in the control devices which are to be addressed are closed and the latter's transmission units are turned off; and
   the time $T_{MAX}$, is chosen to be greater than any of the times $T_{SG}$ which are individually assigned to the respective control devices which are to be addressed.

9. The method as claimed in claim 8, wherein, during address allocation the address of the control device which is to be addressed is obtained by one of:
   transferring an address transmitted by a control device at the start of the address allocation period; and
   incrementing an address sent by a control device at the start of an addressing cycle.

10. The method as claimed in claim 9, wherein the address allocation period is produced as part of an addressing cycle and is started repeatedly by means of automatic flow control.

11. The method as claimed in claim 10, wherein after a particular time $T_{CYC}$ the address allocation period is restarted, with $T_{CYC}$ being greater than $T_{MAX}$.

12. A bus system for a plurality of control devices that are connected by a common data bus line, each of the control devices having a respective transmission/reception unit for simultaneously accessing data sent via the common data bus line, where at least one control device has isolating means for switchably interrupting the data bus line, and the at least one control device has a measuring arrangement which measures an electrical current or voltage signal on the data bus line at an output of said at least one control device, which output is supplied to a downstream control device, wherein:
   the measuring arrangement has first means for controlling the isolating means and the transmission/reception unit in the at least one control device; and
   said first means takes an evaluation of the measured electrical current or voltage signal as a basis for controlling the isolating means and the transmission/reception unit.

13. The bus system as claimed in claim 12, wherein:
   the measuring arrangement has a comparison means to which the voltage level at the output of the control device is supplied as an input signal on the data bus line; and
   the output signal from the comparison means forms the input signal for controlling the isolating means and the transmission/reception unit.

14. The bus system as claimed in claim 13, wherein the isolating means comprises one of a switching transistor, a relay and a repeater.

15. A method for assignment of addresses to a plurality of control units that are connected by a common data bus line, said method comprising:

one of said control units, acting as a master unit, transmitting a message to remaining control units, acting as slave units, via said data bus line, thereby initiating an address allocation period;

in response to said message, during said address allocation period, each of said slave units opening a switch to break said data bus line within said slave unit, and causing a dominant signal to be present at its input, which is connected to an output of a preceding slave unit;

each slave unit detecting whether a dominant signal is present at its output; and only a slave unit which does not detect a dominant signal at its output accepting an address transmitted from the master unit at a preset time during a particular address allocation period.

* * * * *